(12) United States Patent
Wong

(10) Patent No.: US 6,700,891 B1
(45) Date of Patent: Mar. 2, 2004

(54) APPARATUS AND METHOD FOR PROVIDING A DEVICE LEVEL SECURITY MECHANISM IN A NETWORK

(75) Inventor: Dean W. Wong, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/104,883

(22) Filed: Jun. 25, 1998

(51) Int. Cl.[7] ............................................... H04J 12/56
(52) U.S. Cl. ........................ 370/401; 370/389; 370/428
(58) Field of Search ................................. 370/401, 389, 370/395.1, 402; 713/200, 201; 709/225

(56) References Cited

U.S. PATENT DOCUMENTS

| | | | |
|---|---|---|---|
| 5,473,607 A | * 12/1995 | Hausman et al. | 370/389 |
| 5,761,424 A | * 6/1998 | Adams et al. | 395/200.47 |
| 5,790,804 A | * 8/1998 | Osborne | |
| 5,917,821 A | * 6/1999 | Gobuyan et al. | 370/392 |
| 5,920,567 A | * 7/1999 | Saito et al. | 370/404 |
| 5,931,946 A | * 8/1999 | Terada | |
| 5,951,651 A | * 9/1999 | Lakshiman et al. | 709/239 |
| 5,960,177 A | * 9/1999 | Tanno | 395/200.59 |
| 6,092,110 A | * 7/2000 | Maria et al. | 709/225 |
| 6,219,706 B1 | * 4/2001 | Fan et al. | 709/225 |
| 6,609,154 B1 | * 8/2003 | Fuh et al. | 709/225 |

OTHER PUBLICATIONS

Apple Computer, Inc.; Inside Macintosh, vol. VI, p. 32–7; Second printing, Jun. 1991; Addison–Wesley Publishing Company, Inc., USA, ISBN 0–201–57755–0.

Apple Computer, Inc.; Inside Macintosh X–Ref, Revised Edition, pp. 263, 264, 283, 288; Second printing, Sep. 1991; Addison Wesley Publishing Company, Inc., USA, ISBN 0–201–57769–0.

* cited by examiner

*Primary Examiner*—Kenneth Vanderpuye
(74) *Attorney, Agent, or Firm*—Beyer Weaver & Thomas LLP (57) ABSTRACT

A method and apparatus for filtering a packet in a network is disclosed. The packet includes a packet header and packet data. The packet is intercepted. It is then determined if an access list exists for the packet, the access list including filtering criteria that dictates filtering of the packet in accordance with contents of the packet data. If no access list is determined to exist for the packet, the packet is forwarded. However, if an access list is determined to exist for the packet, the packet is filtered in accordance with the filtering criteria stored in the access list.

34 Claims, 8 Drawing Sheets

| OBJECT | TYPE | ZONE | ACTION |
|---|---|---|---|
| ≈ | PRINTER | LEGAL | DENY |
| ≈ | PRINTER | HUMAN RESOURCES | PERMIT |
| LEGAL FILES | FILE SERVER | LEGAL | PERMIT |
| PATENT DISCLOSURES | FILE SERVER | ENGINEERING | PERMIT |
| ⋮ | ⋮ | ⋮ | ⋮ |

*FIG. 5A*

| ID | OBJECT | TYPE | ZONE | ACTION |
|---|---|---|---|---|
| 1 | ≈ | PRINTER | LEGAL | DENY |
| 2 | ≈ | PRINTER | HUMAN RESOURCES | PERMIT |
| 3 | LEGAL FILES | FILE SERVER | LEGAL | PERMIT |
| 3 | PATENT DISCLOSURES | FILE SERVER | ENGINEERING | PERMIT |
| ⋮ | ⋮ | ⋮ | ⋮ | ⋮ |

APPARATUS AND METHOD FOR PROVIDING A DEVICE LEVEL SECURITY MECHANISM IN A NETWORK

BACKGROUND OF THE INVENTION

1. Field of the Invention

The present invention relates generally to a network security system. More particularly, the present invention relates to a method and apparatus for filtering a packet using data contained within the packet.

2. Description of the Related Art

Communication on most networks is accomplished through the sending of information in packets. Typically, each packet comprises a packet header and packet data. For example, the packet header often will include a source address and a destination address. Packet switched networks may differ in their technical design, such as the number or contents of the layers present and the protocols used. For example, the Macintosh AppleTalk network uses a Name-Binding Protocol (NBP) that maintains a table containing an internet address and name of each entity that is visible to other entities on the internet.

In accordance with the Name-Binding Protocol, each device, or node, attached to an AppleTalk network has a unique AppleTalk entity name. An AppleTalk entity name includes three fields: object, type, and zone. The first field, the object, is assigned by the entity as a logical identifier of the entity (e.g., the name of the computer user). The second field, the type, is assigned by the entity, and may be used to identify the device type of the entity (e.g., printer, computer, file server, facsimile). The third field, the zone, is a logical grouping of a subset of the nodes on the internet. In this manner, the internet may be divided into zones, each of the zones defining a logical group of addresses. For example, zone designations would be useful in separating departments within a company. This would permit a common user name such as John Smith to be used in combination with a given department (e.g., legal) to distinguish other users having the same user name. The Name-Binding Protocol supplies the internet address of each network-visible entity in the internet by providing its name. Thus, the Name-Binding Protocol maps each name to an internet address, thereby providing the link between a user-supplied name for an entity and the internet address that is used by the protocol used to send and receive data packets.

Even if a packet has been sent, it may not be desirable for various reasons to forward the packet to its destination. For instance, most local area network (LAN) interfaces have a promiscuous mode, in which all packets are forwarded to a receiving host, such as a computer or a printer. However, for most applications, promiscuity is not desirable. Instead, a packet may be filtered in accordance with specific criteria such as the destination address of the packet. A packet is filtered when the packet is discarded rather than forwarded. Accordingly, through the insertion of a switching element such as a router or bridge, it is possible to isolate portions of the network through the use of filtering.

Filtering is often performed to provide a level of security within a network. In a widely used approach, filtering is performed based on the source and/or destination addresses contained within the packet header. Most packet filtering is implemented with a single packet filter applying a set of rules to all packets incoming or outgoing from a network device. This approach is limiting, especially when a device services different networks or parts of a single network that have different security policies. Although packet data has not traditionally been used in filtering mechanisms, packet data often contains useful information. By way of example, each AppleTalk entity name includes the type of a sending or receiving host (e.g., a printer) in accordance with the Name-Binding Protocol. Typically, the Name-Binding Protocol is used to advertise services rather than limit access to these services. However, it would be beneficial if such information were used to prevent or hide access to groups of various resources on the network, such as printers, file servers and applications. As can be appreciated, security breaches and unwanted network traffic could be greatly reduced if filtering of packets could be performed based upon the type of resource, or other logical grouping of network resources. Accordingly, it would be desirable to filter packets in accordance with the content of the packet data. It would also be desirable if security could be implemented in a security device with different security rules being implemented for incoming and outgoing packets, as well as for packets incoming from or outgoing to different paths.

In view of the above, a system and method for providing a device level security mechanism using packet data would be desirable. Additionally, it would be beneficial if a system and method were developed for filtering packets in accordance with the packet data rather than the packet header.

SUMMARY OF THE INVENTION

The present invention is a system and method for providing a device level security mechanism in a network. This is accomplished through the filtering of each packet using the packet data rather than the packet header. Accordingly, network traffic may be monitored and controlled using this filtering mechanism.

In accordance with one aspect of the present invention, a method and system for filtering a packet in a network is disclosed. The packet includes a packet header and packet data. Initially, the packet is intercepted. It is then determined if an access list exists for the packet, the access list including filtering criteria that dictates filtering of the packet in accordance with contents of the packet data. If no access list is determined to exist for the packet, the packet is forwarded. However, if an access list is determined to exist for the packet, the packet is filtered in accordance with the filtering criteria stored in the access list.

In accordance with another aspect of the present invention, the filtering step further includes parsing the packet to obtain the packet header and the packet data, searching the filtering criteria in the access list for an entry corresponding to the parsed packet data to obtain selected packet filtering criteria, and dropping the packet in accordance with the selected packet filtering criteria.

In accordance with another aspect of the present invention, a default mode may be established for use in instances when no access list exists for a given packet. The default mode may be a send mode in which the packet is forwarded or a drop mode in which the packet is dropped. Accordingly, the packet may be forwarded only when the default mode is the send mode.

In accordance with yet another aspect, the present invention may include setting up a filtering mode in addition to the default mode. The filtering mode may comprise a send mode in which the packet is forwarded, or a drop mode in which the packet is dropped. The searching step fails if the selected packet filtering criteria is not obtained, and otherwise passes. If the searching step fails, the packet is forwarded only if the filtering mode is the send mode. However, if the searching step passes, the packet is discarded in accordance with the selected packet filtering criteria. Thus, the filtering mode is useful if an access list for a given packet exists but does not contain filtering criteria corresponding to the parsed packet data.

In accordance with another aspect of the present invention, the present invention provides a switching element for filtering a packet in a network. Such a switching element includes a processor and a memory. The memory has stored therein (1) means for intercepting a packet; (2) means for determining if an access list exists for the packet, the access list including filtering criteria that dictates filtering of the packet in accordance with contents of the packet data; (3) means for forwarding the packet if no access list is determined to exist for the packet; and (4) means for filtering the packet in accordance with the filtering criteria stored in the access list if an access list is determined to exist for the packet. Accordingly, each of the entries in the access list may designate filtering criteria associated with the source or the destination of the packet. For example, an access list may be placed at both ingress and egress lines within the router. Hence, two levels of filtering may be provided to ensure system security.

The advantages of filtering a packet in accordance with the contents of the packet data are numerous. The present invention may be used to prevent access to or hide the existence of various resources or devices within the network, such as printers, file servers and applications. For example, in an AppleTalk network, zone designations may be used to prevent the sending of packets between various zones. Similarly, device types may be used to limit access to various devices. As a result, security breaches may be substantially diminished. In addition, unwanted network traffic may be minimized through the use of the present invention. Moreover, if a network is partitioned into segments by firewalls using the packet data, a disruption will spread only as far as the firewall, therefore affecting only a portion of the network.

DETAILED DESCRIPTION OF THE PREFERRED EMBODIMENTS

Those of ordinary skill in the art of network technology will realize that the following description of the embodiments of the present invention is illustrative only and is not intended to be in any way limiting. Rather, it is intended that the invention be limited only by the appended claims. Other embodiments of the invention will readily suggest themselves to such skilled persons from an examination of the within disclosure.

The present invention provides a method and system for filtering packets based on the content of the packet data. The invention can be implemented in numerous ways, including as a method, an apparatus such as a router or network switch, or a computer readable medium. Several embodiments of the invention are discussed below.

Figure 1:
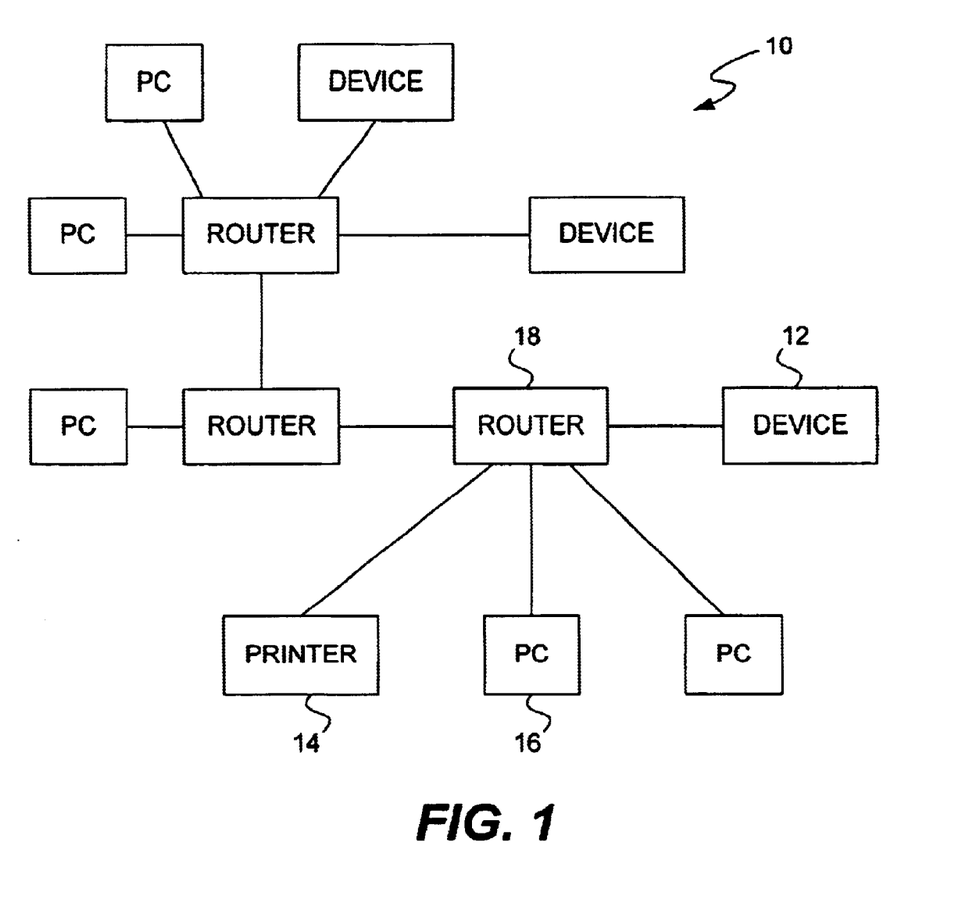
FIG. 1 is a block diagram illustrating a network system in which the present invention may be implemented.

Referring first to FIG. 1, a block diagram illustrating a network system 10 in which the present invention may be implemented is shown. The network 10 includes a number of hosts 12. These hosts 12 include printers 14 and computers 16. The hosts 12 may be connected directly, or may be coupled via one or more switching elements 18, such as a router or brouter. Accordingly, the terms "switching element" and "router" are hereinafter used interchangeably.

Figure 2:
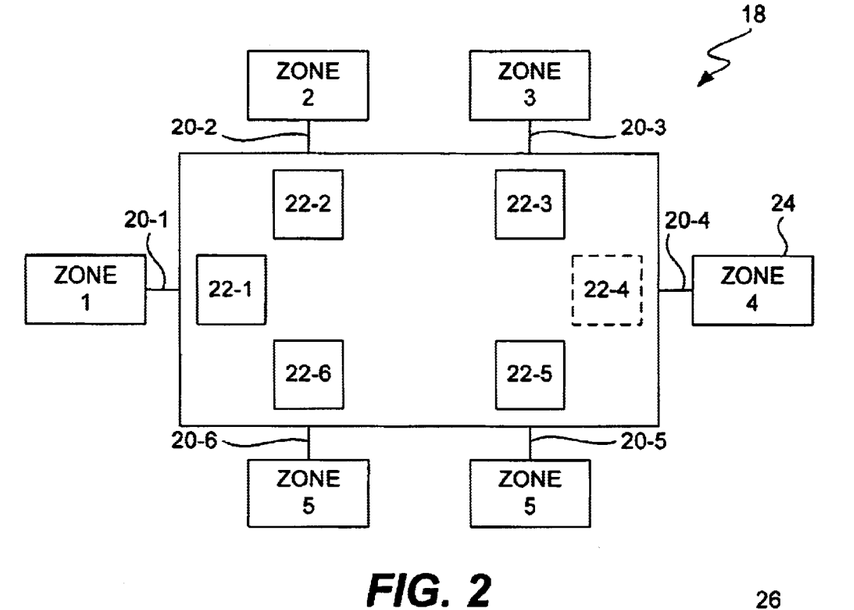
FIG. 2 is a block diagram illustrating a router implementing the present invention.

Referring next to FIG. 2, a block diagram illustrating a switching element 18 implementing the present invention is presented. The switching element 18 (e.g., a router) includes a memory and a processor (not shown). As shown, the switching element 18 includes a plurality of lines 20-1, 20-2, 20-3, 20-4, 20-5, 20-6. In accordance with one embodiment of the present invention, each one of the plurality of lines 20-1, 20-2, 20-3, 20-4, 20-5, 20-6 may have an associated access list 22-1, 22-2, 22-3, 22-4, 22-5, 22-6. For example, an incoming packet at the incoming line 20-2 corresponds to the access list 22-2, while the outgoing packet at the outgoing line 20-6 corresponds to the access list 22-6. Similarly, the line 20-4 does not include the associated access list 22-4. Therefore, any number of access lists between zero and two may be associated with a given packet being sent from a sending host to a receiving host. Moreover, each line may be associated with a different group, or zone 24, of devices. For example, as illustrated, lines 20-5 and 20-6 both correspond to zone 5. In accordance with one embodiment, each access list is stored in random access memory. However, alternative memory devices may be implemented.

Figure 3:
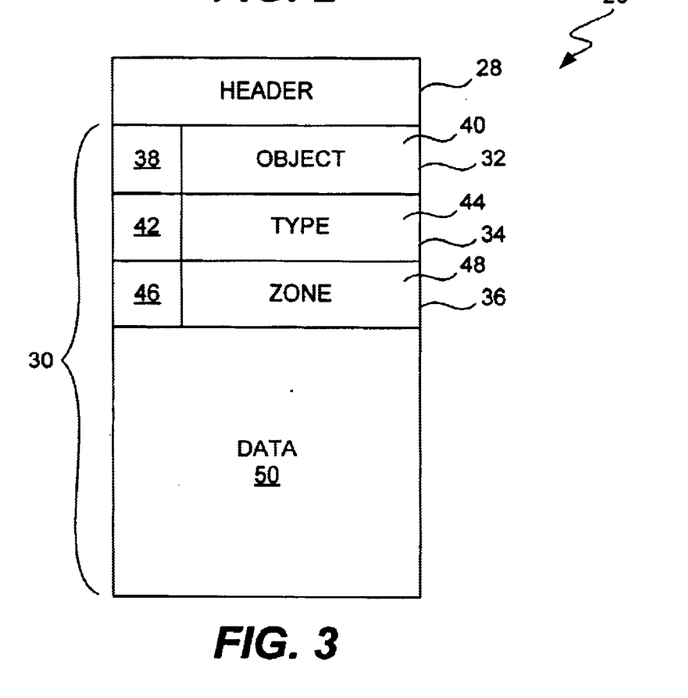
FIG. 3 is a diagram illustrating an exemplary packet which may be filtered in accordance with one embodiment of the present invention.

Referring now to FIG. 3, a diagram illustrating an exemplary packet 26 which may be filtered in accordance with one embodiment of the present invention is shown. The packet 26 includes a packet header 28 and packet data 30. In accordance with one embodiment of the present invention, packet filtering is performed in accordance with the AppleTalk Name-Binding Protocol for use in an AppleTalk network. Accordingly, the packet data 30 includes an object field 32, a type field 34, and a zone field 36 as provided in an AppleTalk entity name. In alternative embodiments, other protocols used in other networks may be implemented. The object field 32 includes an object length byte 38 and object data 40, the type field 34 includes a type length byte 42 and type data 44, and the zone field 36 includes a zone length byte 46 and zone data 48. The object field 32, type field 34, and zone field 36 each comprise between 1 and 33 bytes. Object length byte 38, type length byte 42, and zone length byte 46 each comprise one byte defining the length of the corresponding object data 40, type data 44, and zone data 48 fields. Thus, the object data 40, type data 44, and zone data 48 each may include between 0 and 32 bytes corresponding to the value of the object length byte 38, type length byte 42, and zone length byte 46, respectively. For example, a zone length byte 46 having a value of zero will indicate that no zone data 48 is specified. Alternate or further fields may be used in other embodiments. Moreover, the packet data may include other data 50 not used in the present invention, as shown.

Figure 4A:
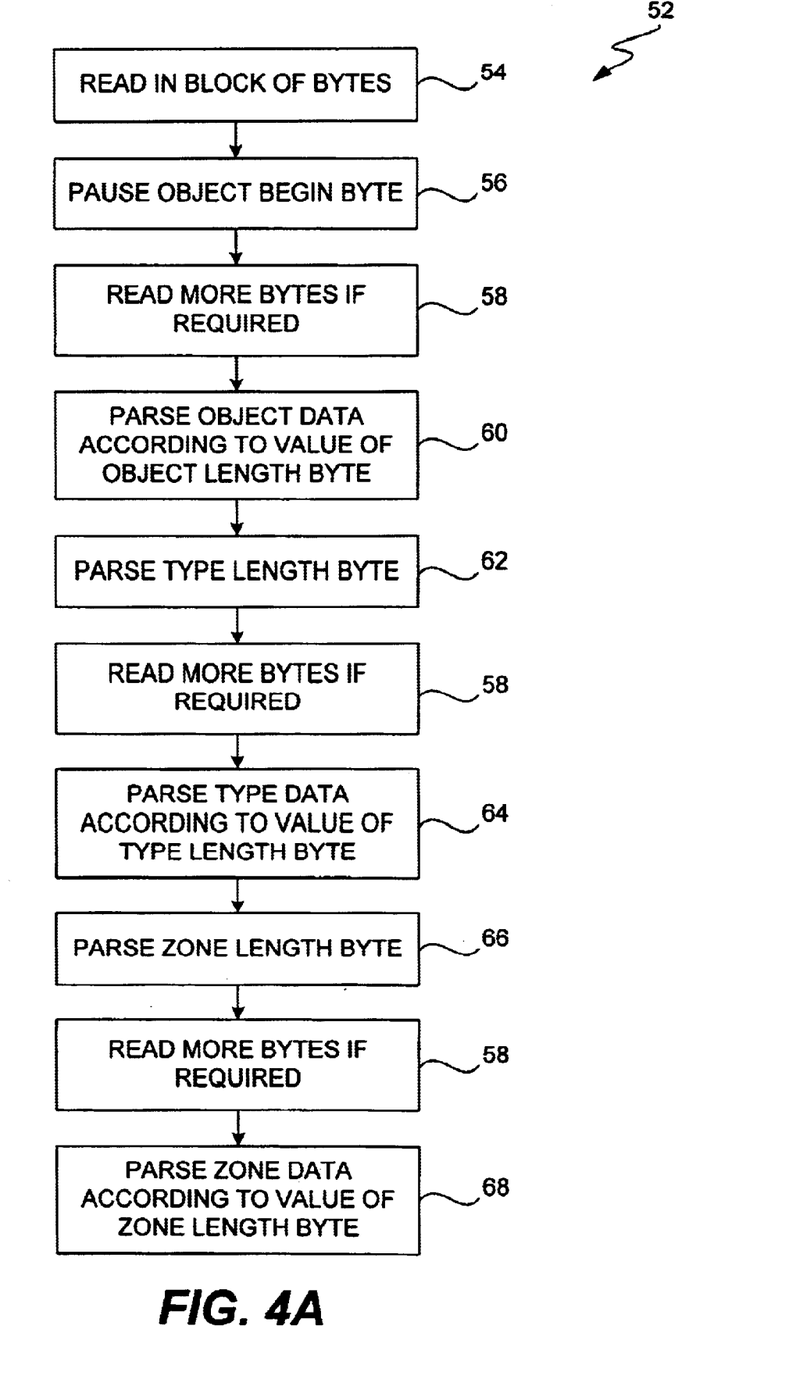
FIG. 4A is a flow diagram illustrating a method for parsing a packet in accordance with one embodiment of the present invention.

Referring now to FIG. 4A, a flow diagram illustrating a method for parsing a packet 52 in accordance with one embodiment of the present invention is presented. First, at step 54, a block of bytes is read. For example, the block of bytes may comprise between 16 and 99 bytes. This read operation is performed to minimize the number of read operations required. However, each packet field may be read individually, as well as in combination. Next, at step 56, the object length byte is parsed. Additional bytes are read at step 58 if required prior to obtaining the object data. Next, at step 60, the object data is parsed in accordance with the value of the object length byte. Next, at step 62, the type length byte is parsed. Additional bytes are read at step 58 if required prior to obtaining the type data. Next, at step 64, the type data is parsed in accordance with the value of the type length byte. Next, at step 66, the zone length byte is parsed. Additional bytes are read at step 58 if required prior to obtaining the zone data. Next, at step 68, the zone data is parsed in accordance with the value of the zone length byte. Moreover, each packet field may be separated by a delimiter, such as the symbol "@", in addition to its corresponding length byte. Similarly, each packet field may include such a delimiter as an alternative to a length byte.

Figure 4B:
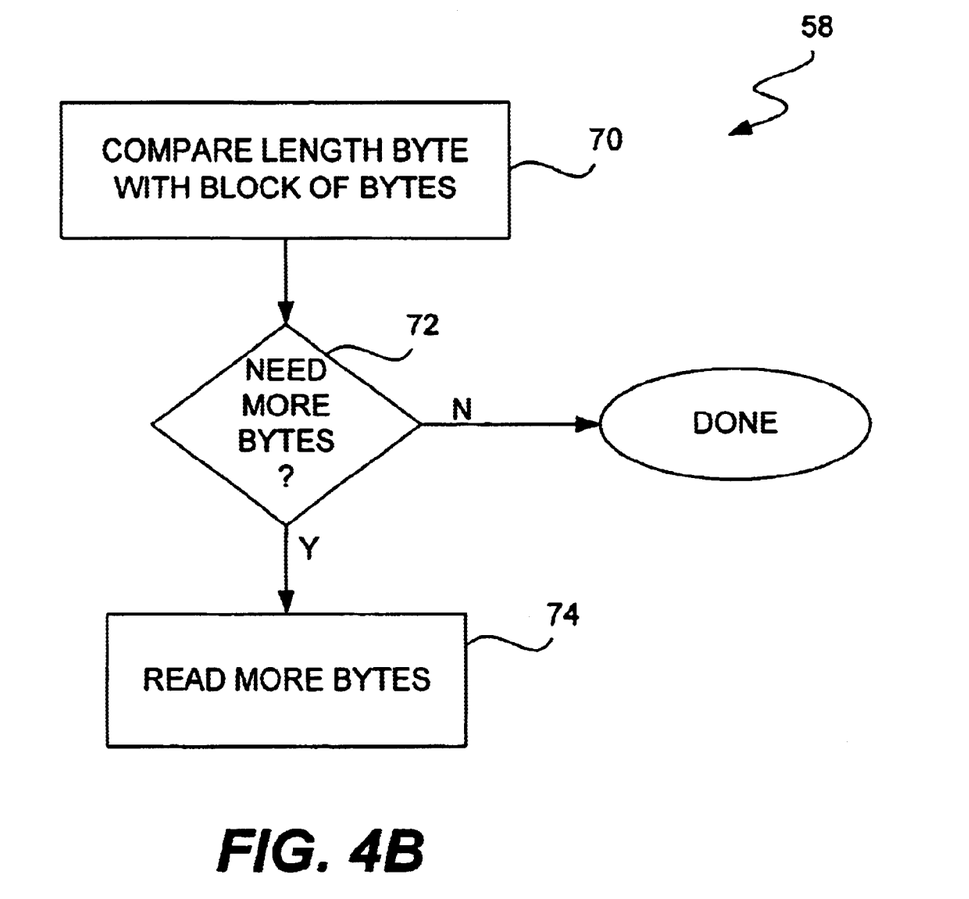
FIG. 4B is a flow diagram illustrating the method for reading bytes shown in FIG. 4A in accordance with one embodiment of the present invention.

Referring next to FIG. 4B, a flow diagram illustrating the method for reading additional bytes 58 shown in FIG. 4A in accordance with one embodiment of the present invention is presented. At step 70, the value of the length byte is compared with the number of unparsed bytes remaining within the block of bytes previously read. At step 72, if it is determined that more bytes are required, more bytes are read in at step 74. However, this procedure could be eliminated if data corresponding to each packet field were read individually.

Figure 5A:
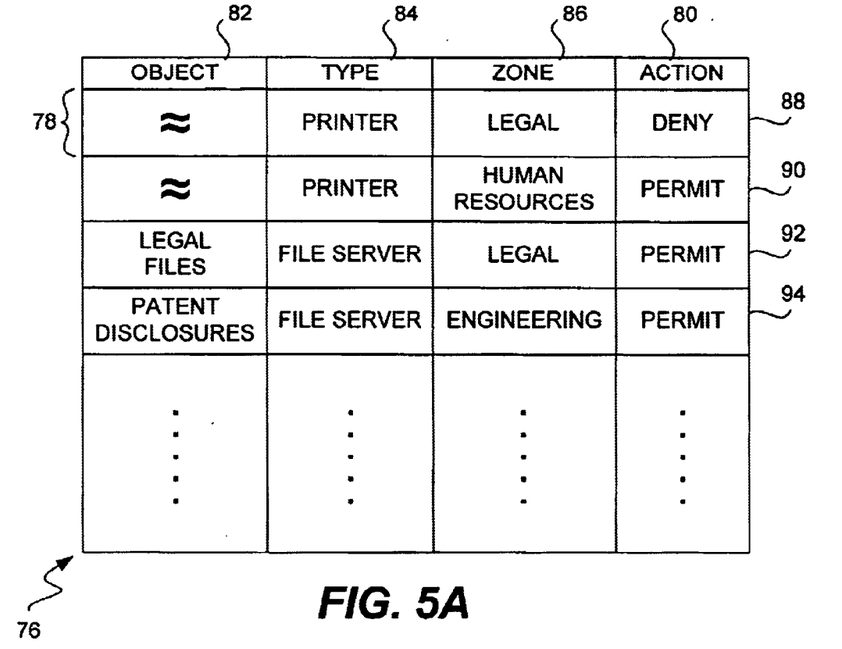
FIG. 5A is a diagram illustrating an exemplary access list in accordance with a first preferred embodiment of the present invention.

Referring next to FIG. 5A, a diagram illustrating an exemplary access list in accordance with one embodiment of the present invention 76 is presented. The access list 76 includes filtering criteria that dictates filtering of the packet in accordance with contents of the packet data. The access list 76 may include a plurality of entries 78, each one of the plurality of entries 78 having separate filtering criteria. In accordance with one embodiment, the filtering criteria includes an action field 80 associated with the packet data, the action field 80 dictating forwarding of the packet when in a first state, and discarding the packet when in a second state. As illustrated, the action field may "DENY" or "PERMIT" forwarding of a packet meeting specified filtering criteria.

For example, the packet data may include an object, a type, and a zone as provided in an AppleTalk entity name. Each entry in the access list further includes an object 82, a type 84, and a zone 86 field. As shown in FIG. 5A, a first 88, second 90, third 92, and fourth 94 entry are included within the access list. In the first entry 88 within the access list, the object field 82 indicates a name service packet in which a query is performed, indicated by the symbol "≈". The type field 84 of the first entry 88 is "PRINTER", the zone field 86 is "LEGAL", and the action field 80 is "DENY". Thus, any query for a printer located within the legal department would be denied. Similarly, the second entry 90 indicates that a query for a printer located within the Human Resources Department would be permitted. The third 92 and fourth 94 entries provide filtering criteria for a file server, "LEGAL FILES" and "PATENT DISCLOSURES", respectively. As provided in the access list, the file server "LEGAL FILES" is located in the Legal Department, while the file server "PATENT DISCLOSURES" is located in the Engineering Department. When implemented in an access list corresponding to an incoming line to the router, the incoming line corresponding to a packet sent from the file server, "LEGAL FILES, the third entry 92 indicates that packets sent from the file server "LEGAL FILES" will be forwarded. Similarly, the third entry 92, if implemented in an access list corresponding to an outgoing line from the router, would indicate that packets sent to the file server "LEGAL FILES" would be forwarded. The fourth entry 94 would similarly permit packet transfers from the file server "PATENT DISCLOSURES" to another host, or to the file server "PATENT DISCLOSURES" from another host, depending upon where the access list is placed in the router. Accordingly, each of the entries 78 may designate a source or destination in accordance with access list placement within the router to filter packets being sent by the source or received by the destination, respectively. In this manner, access to a file server or other network resource may be limited. Once entered by a user, the filtering criteria in an access list such as that described above may then be searched for an entry corresponding to the parsed packet data to determine whether forwarding is permitted or denied.

Figure 5B:
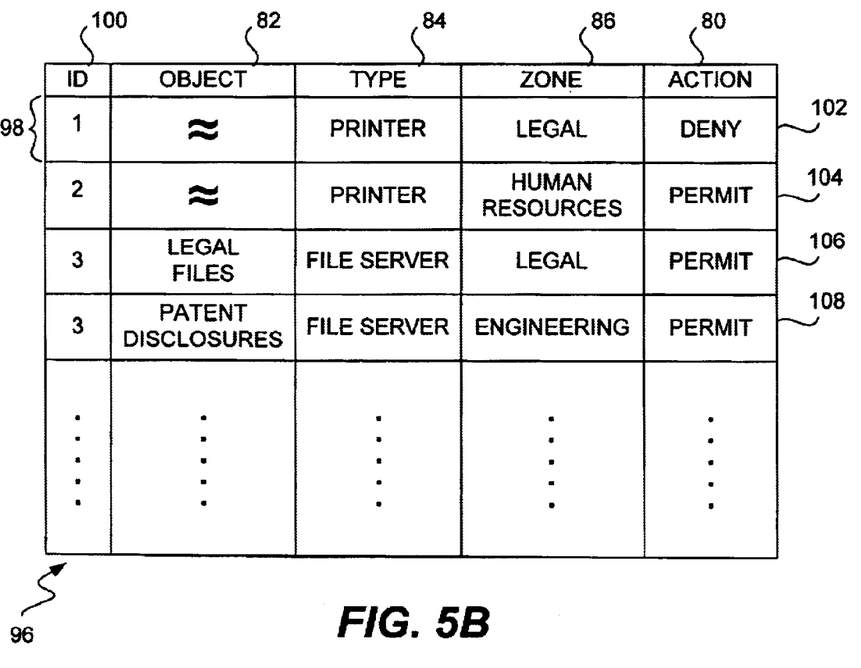
FIG. 5B is a diagram illustrating an exemplary access list in accordance with a second preferred embodiment of the present invention.

Referring now FIG. 5B, a diagram illustrating an exemplary access list in accordance with another embodiment of the present invention 96 is presented. As shown, the access list 96 includes a plurality of entries 98 including various fields as illustrated in FIG. 5A. In accordance with the second preferred embodiment, each one of the plurality of entries 98 within the access list 96 further includes a linking field 100 which permits a coupling between selected ones of the plurality of entries 98. The linking field 100 may comprise one or more bits, or other representation.

In accordance with the second preferred embodiment, a set of the plurality of entries 98 corresponding to the parsed packet data may be located using the linking field 100 once the entry corresponding to the parsed packet data is obtained. The filtering criteria for the set of the plurality of entries may then be merged with the filtering criteria for the entry corresponding to the parsed packet data to obtain the selected packet filtering criteria. As described above, the filtering criteria may include an action field 80 associated with the packet data provided in object, type, and zone fields 82, 84, 86, the action field 80 dictating forwarding of the packet when in a first state, and discarding of the packet when in a second state. In accordance with one embodiment, the action field 80 comprises a single bit. Therefore, the merge operation may comprise an operation such as a logical AND operation, a logical OR operation, or a logical EXCLUSIVE OR operation. The action field may comprise a plurality of bits, or other representation.

For example, as shown in FIG. 5B, the linking field 100 designates a "1" for first entry 102 and a "2" for second entry 104. In addition, the linking field 100 for third 106 and fourth 108 entries designates a "3", indicating that the third 106 and fourth 108 entries are linked. As a result, the filtering criteria within the corresponding action fields 80 is merged in accordance with the specified merge operation. Therefore, access to the file server may be allowed as provided in the third and fourth entries 106, 108 if the specified merge operation is satisfied.

If the filtering criteria for the entries to be merged are mutually exclusive, a predetermined guideline for selecting the filtering criteria for one of the entries may be established. For example, if one entry specifies that packet forwarding for a specified object, type and zone is to be denied, and another entry specifies that such communication is to be permitted, the communication must either be permitted or denied in accordance with one of the two entries. Accordingly, the filtering criteria may be selected from the first conflicting entry. Alternatively, the filtering criteria may be selected from the last conflicting entry, since this entry may be the most recent entry.

Figure 6:
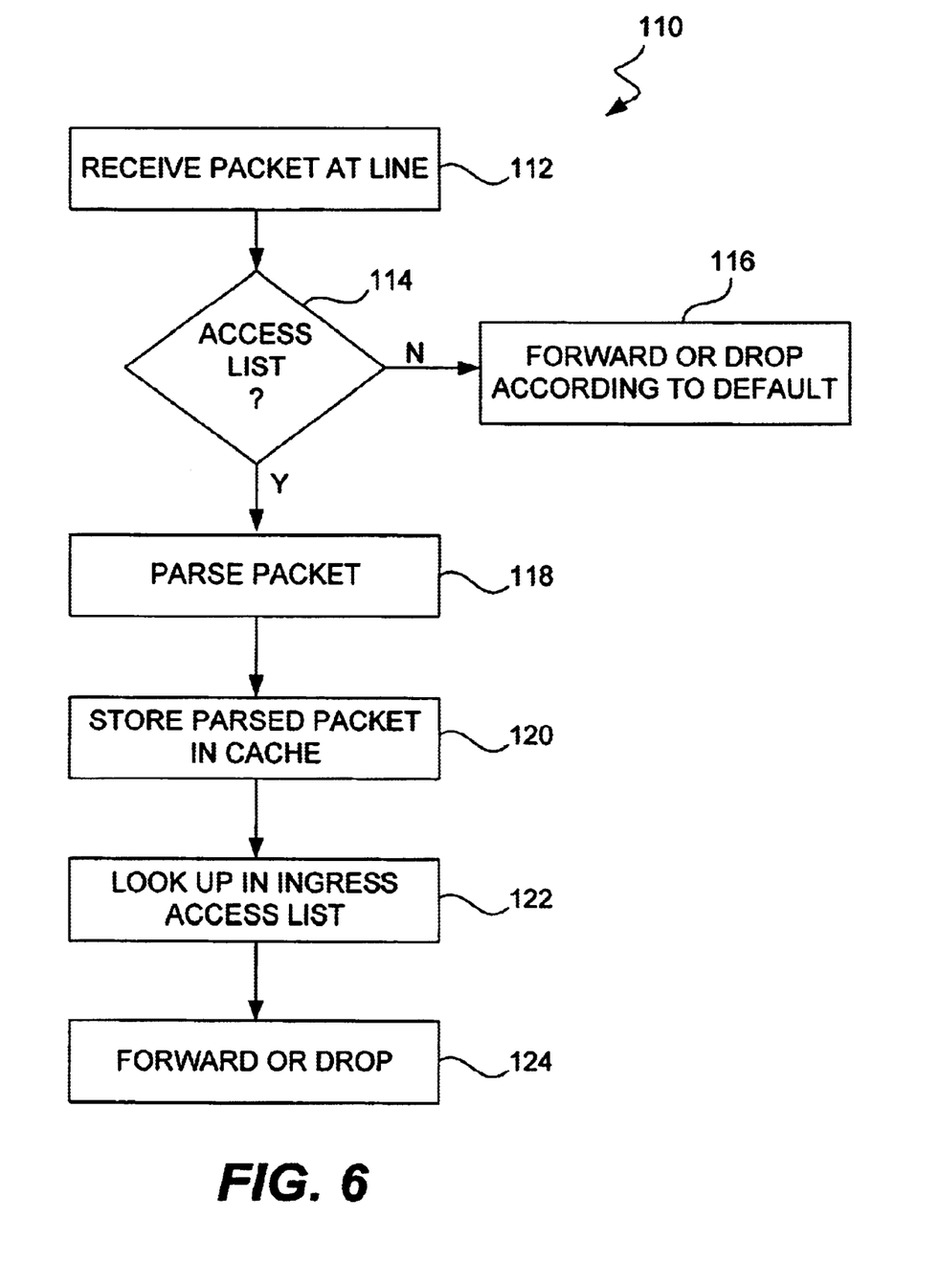
FIG. 6 is a flow diagram illustrating a method for filtering an incoming packet to a switching element using an access list in accordance with one embodiment of the present invention.

Referring now to FIG. 6, a flow diagram illustrating a method for filtering an incoming packet 110 to a switching element using an access list in accordance with one embodiment of the present invention is presented. First, at step 112, a packet being sent from a sending host to a receiving host is intercepted. In accordance with a preferred embodiment of the present invention, the packet is intercepted at an incoming line to a router. Next, at step 114, it is determined if an ingress access list exists for the packet, the ingress access list including filtering criteria that dictates filtering of the packet in accordance with contents of the packet data. If no ingress access list is determined to exist for the packet, several alternatives exist at step 116. A default mode may be established which may comprise a send mode in which the packet is forwarded or a drop mode in which the packet is dropped. Accordingly, the packet may be forwarded to the receiving host only when the default mode is the send mode. However, if an ingress access list is determined to exist for the packet, the packet is filtered in accordance with the filtering criteria stored in the ingress access list.

Filtering is performed in several steps. At step 118, the packet is parsed to obtain the packet header and the packet data. The parsed packet data may then be stored in a memory location at step 120. In accordance with one embodiment of the present invention, the memory location is a software cache associated with a corresponding incoming line in the router. For example, the cache may be built in a portion of a memory buffer in the incoming line. Thus, each line in the router may include a separate cache. This allows the parsed packet data to be retrieved from the memory location associated with the incoming line prior to being processed at an egress access list associated with an outgoing line in the router. Accordingly, the packet must be parsed only once to be processed at both incoming and outgoing lines in the router. The packet may be parsed as required at both lines, eliminating the need for step 120. Moreover, although a cache is desirable since it provides an increased access speed and transfer rate, alternative data storage mechanisms are possible. Next, at step 122, the filtering criteria in the ingress access list is searched for an entry corresponding to the parsed packet data to obtain selected packet filtering criteria. The packet is then forwarded or dropped in accordance with the selected packet filtering criteria at step 124 as shown in FIG. 8.

Figure 7:
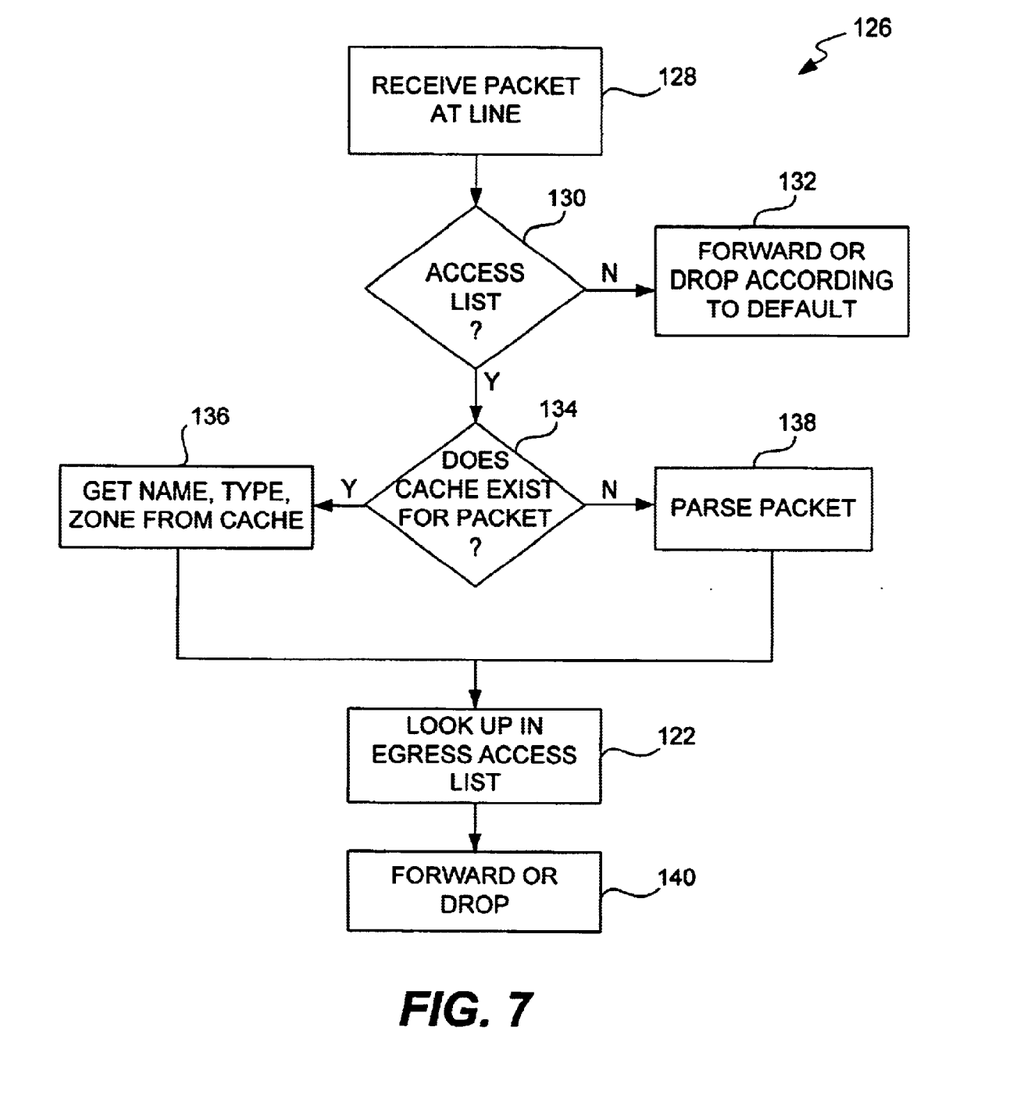
FIG. 7 is a flow diagram illustrating a method for filtering an outgoing packet from a switching element using an access list in accordance with one embodiment of the present invention.

Referring now to FIG. 7, a flow diagram illustrating a method for filtering an outgoing packet 126 from a switching element using an access list in accordance with one embodiment of the present invention is presented. First, at step 128, the packet being sent from the sending host to the receiving host is intercepted. In accordance with a preferred embodiment of the present invention, the packet is intercepted at at an outgoing line to the router. Next, at step 130, it is determined if an egress access list exists for the packet. The egress access list includes filtering criteria that dictates filtering of the packet in accordance with contents of the packet data. If no egress access list is determined to exist for the packet, several alternatives exist at step 132, as described above. A default mode may be established which may comprise a send mode in which the packet is forwarded or a drop mode in which the packet is dropped. Accordingly, the packet may be forwarded to the receiving host only when the default mode is the send mode. However, if an egress access list is determined to exist for the packet, the packet is filtered in accordance with the filtering criteria stored in the egress access list.

Filtering is performed in steps 134 through 140. At step 134, it is established whether the packet has been parsed. In accordance with one embodiment, the packet has been parsed if a cache exists for the packet. However, alternative systems for storage and retrieval of the packet data may be implemented. Thus, at step 134, it is ascertained whether a cache exists for the packet, the cache being associated with a line in a switching element. If a cache exists for the packet, the parsed packet data is retrieved from the cache at step 136. As described above, the packet data may include an object, a type, and a zone. If a cache does not exist for the packet, the packet is parsed at step 138 to obtain the packet header and the packet data. Next, at step 122, the filtering criteria in the egress access list is searched for an entry corresponding to the parsed packet data to obtain selected packet filtering criteria. The packet is then forwarded or dropped at step 140 in accordance with the selected packet filtering criteria as shown in FIG. 8.

Figure 8:
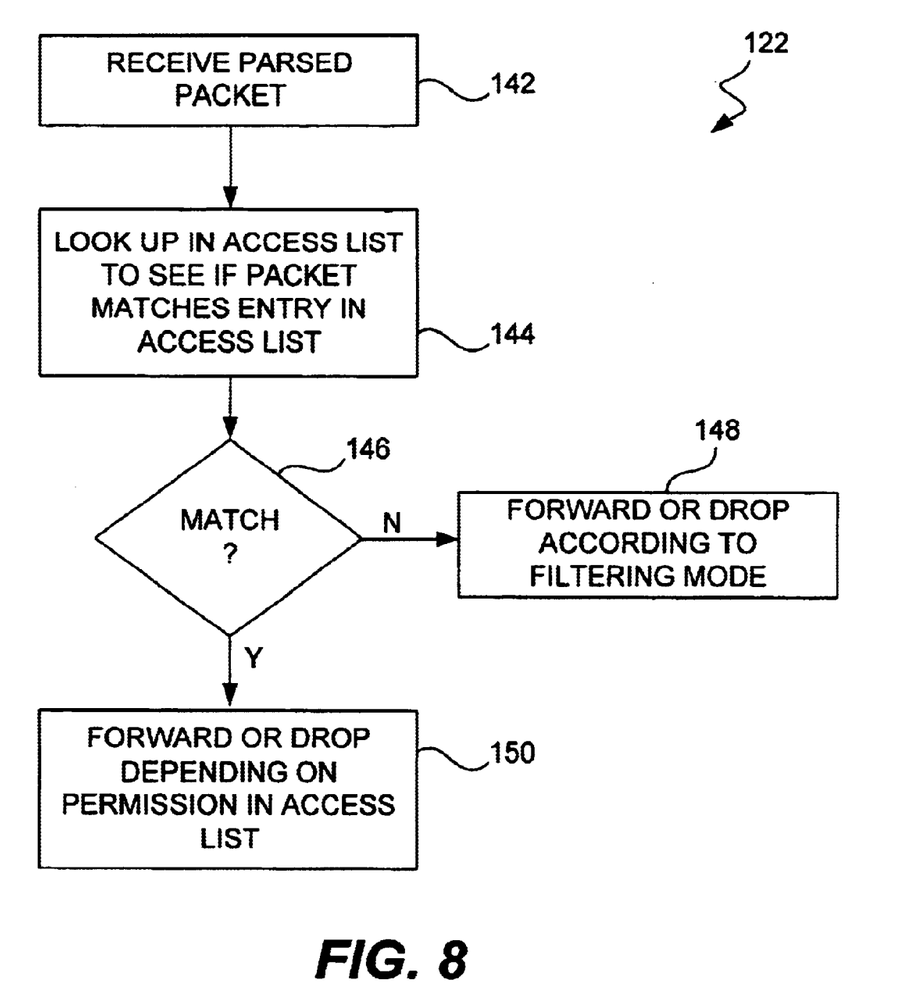
FIG. 8 is a flow diagram illustrating a method for matching the parsed packet data with an entry in an access list in accordance with one embodiment of the present invention.

Referring now to FIG. 8, a flow diagram illustrating a method for matching the parsed packet data with an entry in an access list 122 in accordance with one embodiment of the present invention is presented. At step 142, the parsed packet data is received. Next, at step 144, the filtering criteria in the access list is searched for an entry corresponding to the parsed packet data to obtain selected packet filtering criteria. According to one embodiment, each entry in the access list is parsed to permit the parsed packet data to be compared with the entry. If no entry in the access list is determined to exist for the packet at step 146, the selected packet filtering criteria is not obtained, and the searching step fails. In all other instances, the searching step passes.

If the searching step fails, several alternatives exist at step 148. First, the packet may be forwarded to the receiving host. Second, the packet may be dropped. Third, a filtering mode may be established which may comprise a send mode in which the packet is forwarded to the receiving host, or a drop mode in which the packet is dropped. Accordingly, the packet may be forwarded to the receiving host only if the filtering mode is the send mode. However, if the searching step passes, the packet is forwarded or discarded in accordance with the selected packet filtering criteria at step 150. The filtering mode, therefore, may be useful if an access list exists but does not contain filtering criteria corresponding to the parsed packet data.

The default mode and the filtering mode may be identical. Thus, as described above, in the absence of an access list for a received packet, the packet may be either forwarded or discarded in accordance with the default mode. Similarly, if an access list exists but does not include an entry corresponding to the parsed packet data, the packet may be forwarded or discarded as defined in the default mode.

The invention can also be embodied as computer readable code on a computer readable medium. The computer readable medium is any data storage device that can store data which can thereafter be read by a computer system. Examples of the computer readable medium include read-only memory, random-access memory, CD-ROMs, magnetic tape, and optical data storage devices. The computer readable medium can also be distributed over a network between coupled computer systems so that the computer readable code is stored and executed in a distributed fashion.

Although illustrative embodiments and applications of this invention are shown and described herein, many variations and modifications are possible which remain within the concept, scope, and spirit of the invention, and these variations would become clear to those of ordinary skill in the art after perusal of this application. Broadly speaking, the operations described above may be used to filter packets based on the content of the packet data using a set of access lists. By way of example, the set of access lists and intermediate data (e.g., parsed packet data) may be stored on a disk drive, a hard drive, a floppy disk, a server computer, or a remotely networked computer. Accordingly, the present embodiments are to be considered as illustrative and not restrictive, and the invention is not to be limited to the details given herein, but may be modified within the scope and equivalents of the appended claims.

What is claimed is:

1. A method for filtering a packet in a network, comprising:

intercepting a packet having a packet header and a packet body including packet data providing control information;

determining if an access list exists for the packet, the access list including filtering criteria that dictates filtering of the packet in accordance with the control information in the packet body;

if no access list is determined to exist for the packet, forwarding the packet; and if an access list is determined to exist for the packet, filtering the packet in accordance with the filtering criteria stored in the access list.

2. The method as recited in claim 1, wherein filtering the packet further includes:

parsing the packet to obtain the control information;

searching the filtering criteria in the access list for an entry corresponding to the parsed control information to obtain selected packet filtering criteria; and dropping the packet in accordance with the selected packet filtering criteria.

3. The method as recited in claim 2, wherein searching the filtering criteria fails if the selected packet filtering criteria is not obtained, and otherwise passes.

4. The method as recited in claim 3, wherein dropping the packet further includes:

if searching the filtering criteria fails, forwarding the packet; and if searching the filtering criteria passes, discarding the packet in accordance with the selected packet filtering criteria.

5. The method as recited in claim 2, wherein dropping the packet further includes:

storing the parsed control information in a memory location.

6. The method as recited in claim 5, wherein the memory location is associated with a line in a switching element.

7. The method as recited in claim 2, wherein dropping the packet further includes:

ascertaining whether a cache exists for the packet, the cache being associated with a line in a switching element;

building a cache if it is ascertained that a cache does not exist for the packet; and storing the parsed control information in the cache.

8. The method as recited in claim 1, wherein filtering the packet further includes:

establishing whether the packet has been parsed;

parsing the packet to obtain the control information if it is established that the packet has not been parsed;

obtaining the parsed control information if it is determined that the packet has been parsed;

searching the filtering criteria in the access list for an entry corresponding to the parsed control information to obtain selected packet filtering criteria; and dropping the packet in accordance with the selected packet filtering criteria.

9. The method as recited in claim 8, wherein searching the filtering criteria fails if the selected packet filtering criteria is not obtained, and otherwise passes.

10. The method as recited in claim 9, wherein dropping the packet further includes:

if searching the filtering criteria fails, forwarding the packet; and if searching the filtering criteria passes, discarding the packet in accordance with the selected packet filtering criteria.

11. The method as recited in claim 8, wherein obtaining the parsed control information further includes:

obtaining the parsed control information from a pre-determined memory location.

12. The method as recited in claim 11, wherein the pre-determined memory location is associated with a line in a switching element.

13. The method as recited in claim 8, wherein establishing whether the packet has been parsed further includes:

ascertaining whether a cache exists for the packet, the cache being associated with a line in a switching element.

14. The method as recited in claim 1, further including:

establishing a default mode, the default mode being a send mode in which the packet is forwarded, and otherwise being a drop mode in which the packet is dropped; and wherein forwarding the packet is performed if the default mode is the send mode.

15. The method as recited in claim 14, wherein filtering the packet further includes:

parsing the packet to obtain the control information;

searching the filtering criteria in the access list for an entry corresponding to the parsed control information to obtain selected packet filtering criteria; and dropping the packet in accordance with the selected packet filtering criteria.

16. The method as recited in claim 15, wherein searching the filtering criteria fails if the selected packet filtering criteria is not obtained, and otherwise passes.

17. The method as recited in claim 16, wherein dropping the packet further includes:

if searching the filtering criteria fails, forwarding the packet if the default mode is the send mode; and if searching the filtering criteria passes, discarding the packet in accordance with the selected packet filtering criteria.

18. The method as recited in claim 14, wherein filtering the packet further includes:
   establishing whether the packet has been parsed;
   parsing the packet to obtain the control information if it is established that the packet has not been parsed;
   obtaining the parsed control information if it is determined that the packet has been parsed;
   searching the filtering criteria in the access list for an entry corresponding to the parsed control information to obtain selected packet filtering criteria; and
   dropping the packet in accordance with the selected packet filtering criteria.

19. The method as recited in claim 18, wherein searching the filtering criteria fails if the selected packet filtering criteria is not obtained, and otherwise passes.

20. The method as recited in claim 19, wherein dropping the packet further includes:
   if searching the filtering criteria fails, forwarding the packet if the default mode is the send mode; and
   if searching the filtering criteria passes, discarding the packet in accordance with the selected packet filtering criteria.

21. The method as recited in claim 16, wherein dropping the packet further includes:
   setting up a filtering mode, the filtering mode being a send mode in which the packet is forwarded, and otherwise being a drop mode in which the packet is dropped;
   if searching the filtering criteria fails, forwarding the packet if the filtering mode is the send mode; and
   if searching the filtering criteria passes, discarding the packet in accordance with the selected packet filtering criteria.

22. The method as recited in claim 19, wherein dropping the packet further includes:
   setting up a filtering mode, the filtering mode being a send mode in which the packet is forwarded, and otherwise being a drop mode in which the packet is dropped;
   if searching the filtering criteria fails, forwarding the packet if the filtering mode is the send mode; and
   if searching the filtering criteria passes, discarding the packet in accordance with the selected packet filtering criteria.

23. The method as recited in claim 1, wherein the filtering criteria includes an action field associated with the control information, the action field dictating forwarding of the packet when in a first state, and discarding of the packet when in a second state.

24. The method as recited in claim 1, wherein the control information includes an object, a type, and a zone, and wherein the filtering criteria includes an action field associated with the object, the type, and the zone, the action field dictating forwarding of the packet when in a first state, and discarding of the packet when in a second state.

25. The method as recited in claim 2, wherein the access list includes a plurality of entries, each one of the plurality of entries having separate filtering criteria and a linking field, the linking field permitting a coupling between selected ones of the plurality of entries, wherein searching the filtering criteria further includes:
   locating a set of the plurality of entries corresponding to the parsed control information using the linking field; and
   merging the filtering criteria for the set of the plurality of entries with the filtering criteria for the entry corresponding to the parsed control information to obtain the selected packet filtering criteria.

26. The method as recited in claim 8, wherein the access list includes a plurality of entries, each one of the plurality of entries having separate filtering criteria and a linking field, the linking field permitting a coupling between selected ones of the plurality of entries, wherein searching the filtering criteria further includes:
   locating a set of the plurality of entries corresponding to the parsed control information using the linking field; and
   merging the filtering criteria for the set of the plurality of entries with the filtering criteria for the entry corresponding to the parsed control information to obtain the selected packet filtering criteria.

27. The method as recited in claim 15, wherein the access list includes a plurality of entries, each one of the plurality of entries having separate filtering criteria and a linking field, the linking field permitting a coupling between selected ones of the plurality of entries, wherein searching the filtering criteria further includes:
   locating a set of the plurality of entries corresponding to the parsed control information using the linking field; and
   merging the filtering criteria for the set of the plurality of entries with the filtering criteria for the entry corresponding to the parsed control information to obtain the selected packet filtering criteria.

28. The method as recited in claim 18, wherein the access list includes a plurality of entries, each one of the plurality of entries having separate filtering criteria and a linking field, the linking field permitting a coupling between selected ones of the plurality of entries, wherein searching the filtering criteria further includes:
   locating a set of the plurality of entries corresponding to the parsed control information using the linking field; and
   merging the filtering criteria for the set of the plurality of entries with the filtering criteria for the entry corresponding to the parsed control information to obtain the selected packet filtering criteria.

29. A switching element for filtering a packet in a computer network, comprising:
   a processor; and
   a memory having stored therein instructions that, when executed, cause the switching element to perform the steps of:
      intercepting a packet having a packet header and a packet body including packet data providing control information;
      determining if an access list exists for the packet, the access list including filtering criteria that dictates filtering of the packet in accordance with the control information;
      forwarding the packet if no access list is determined to exist for the packet; and
      filtering the packet in accordance with the filtering criteria stored in the access list if an access list is determined to exist for the packet.

30. A computer-readable medium recording software, the software disposed on a computer to perform a method for filtering a packet in a network, the method comprising:
   intercepting a packet having a packet header and a packet body including packet data providing control information;
   determining if an access list exists for the packet, the access list including filtering criteria that dictates filtering of the packet in accordance with the control information;

if no access list is determined to exist for the packet, forwarding the packet; and if an access list is determined to exist for the packet, filtering the packet in accordance with the filtering criteria stored in the access list.

31. A computer data signal embodied in a carrier wave and representing sequences of instructions which, when executed by a processor, cause said processor to perform a method for filtering a packet in a network, the method comprising:

intercepting a packet having a packet header and a packet body including packet data providing control information;

determining if an access list exists for the packet, the access list including filtering criteria that dictates filtering of the packet in accordance with the control information;

if no access list is determined to exist for the packet, forwarding the packet; and if an access list is determined to exist for the packet, filtering the packet in accordance with the filtering criteria stored in the access list.

32. The switching element as recited in claim 29, wherein the control information comprises at least one of a zone field, a type field indicating a device type, and an object field.

33. A method for filtering packets in a network device comprising:

receiving a packet having a packet header and a packet body including packet data providing control information, wherein the control information is not provided in a header of the packet;

parsing the control information into a plurality of fields to determine packet values for the plurality of fields;

matching the packet values for the plurality of fields to an ingress record in an ingress access list;

handling the packet according to an action specified in the ingress record;

matching the packet values for the plurality of fields to an egress record in an egress access list; and handling the packet according to an action specified in the egress record.

34. The method as recited in claim 33, wherein handling the packet according to an action specified in the ingress record comprises forwarding or dropping the packet.

* * * * *